United States Patent [19]

Grodkiewicz et al.

[11] 4,189,208
[45] Feb. 19, 1980

[54] ZINC CHLORIDE OPTICAL FIBERS FOR TRANSMISSION IN THE INFRARED

[75] Inventors: William H. Grodkiewicz, Murray Hill; LeGrand G. van Uitert, Morris Township, Morris County; Stuart H. Wemple, Chatham Township, Morris County, all of N.J.

[73] Assignee: Bell Telephone Laboratories, Incorporated, Murray Hill, N.J.

[21] Appl. No.: 885,198

[22] Filed: Mar. 10, 1978

[51] Int. Cl.$^2$ .......................... G02B 5/14; C03C 25/02
[52] U.S. Cl. ..................................... 350/96.34; 65/3 A
[58] Field of Search ........................ 350/96.34; 65/3 A

[56] References Cited
PUBLICATIONS

I. Schulz, "Zinkchlorid als Glasbildner," Naturwissenschaften, vol. 44, p. 536, 1957.
C. A. Angell, J. Wong, J. Chem. Phys., vol. 53, p. 2053, 1970.

*Primary Examiner*—Rolf G. Hille
*Attorney, Agent, or Firm*—Samuel H. Dworetsky; Peter V. D. Wilde

[57] ABSTRACT

ZnCl$_2$ optical fibers are advantageously used for transmission of radiation in the infrared portion of the spectrum. Losses as low as $10^{-3}$ dB/km may be obtained when radiation of wavelength between 3.0 and 4.5 microns is transmitted in such fibers. Fabrication techniques allow for the formation of graded fibers to further improve transmission characteristics.

14 Claims, 2 Drawing Figures

ZINC CHLORIDE OPTICAL FIBERS FOR TRANSMISSION IN THE INFRARED

BACKGROUND OF THE INVENTION

1. Field of the Invention

This invention involves $ZnCl_2$ fibers for transmission of electromagnetic energy in the infrared portion of the spectrum.

2. Description of the Prior Art

Despite the fact that glass fibers have been known to transmit light for centuries, the application of such fibers to the long-distance transmission of information has been earnestly pursued for only approximately the past decade. In addition to the relatively recent availability of appropriate sources and detectors, this development has been stimulated by the realization that such fibers may be fabricated with low loss (less than 20 dB/km). Such low losses are necessary if information is to be transmitted over significant distances with a commercially viable repeater spacing.

It is widely recognized that the current interest in optical fibers was spurred in part by the realization in the mid-1960's that certain simple glasses have inherent losses between 1 and 10 dB/km, and that the then highloss observations in simple glasses were due almost entirely to impurities which might be removed with careful processing. Glass fabrication techniques which have been developed over the past 10 years, including the CVD, MCVD and soot techniques, have yielded fibers with losses as low as 0.5 dB/km. In addition, techniques for the fabrication of graded fibers enable the realization of low loss characteristics even when multimode transmission configurations are utilized.

Present developmental emphasis centers mainly on fiber loss characteristics in the near region of the optical spectrum, i.e., 0.7 to 2 microns. This emphasis is due in part to the readily available detectors and sources which may be efficiently operated in this region of the spectrum. However, practical and theoretical considerations which govern transmission in optical waveguides suggest only minimal distinction between the visible and infrared regions of the spectrum, and consequently viable commercial alternatives in the infrared portion of the spectrum would have few inherent shortcomings.

While complex glasses were originally considered in the early development of optical fibers, such configurations have been largely foresaken in preference to the simpler silica and doped silica compounds. Nevertheless, materials, other than the now standard silica based compounds, may be found to be useful in particular regions of the spectrum. Such materials, many of which are known to exist in the glass state, may be found to be particularly beneficial for specific applications.

$ZnCl_2$, while it has been known to exist in the glass state (see, for example, *Naturwissenschaften* Vol. 44, p. 536 [1957]), has been relatively difficult to fabricate and has certain inherently poor physical characteristics. As a result little thought has been given to the use of $ZnCl_2$ in optical fibers and no suggestion has been made that it might possess certain outstanding transmission characteristics.

SUMMARY OF THE INVENTION

This invention comprises an optical fiber formed at least in part from $ZnCl_2$. Applicants have found that such a fiber exhibits extremely low loss characteristics in the infrared portion of the spectrum. While the fiber may be used to transmit radiation over a broad range of the infrared spectrum (1 to 7 microns), losses as low as $10^{-3}$ dB/km may be obtained when the fiber is used in the 3.0 to 4.5 micron range of the spectrum. Specific fabrication techniques are suggested which, in addition, permit fabrication of a graded index of refraction to yield improved transmission characteristics when transmission occurs in the widely used multimode configuration.

DETAILED DESCRIPTION

Figure 1:
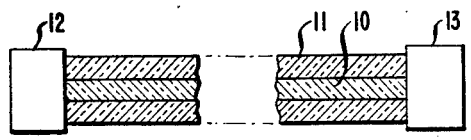
FIG. 1 is a schematic representation of the inventive fiber described in this specification.

Although $ZnCl_2$ has been known to exist in the glass state, applicants have shown that in specific regions of the infrared, highly pure $ZnCl_2$ has inherent losses as low as $10^{-3}$ dB/km. This knowledge, in conjunction with the effective fabrication process suggested by applicants, results in the inventive infrared $ZnCl_2$ fiber. The fiber may be advantageously utilized with appropriate infrared input and output devices, as well as appropriate sources and detectors which operate efficiently in the spectral region of interest. A full appreciation for the invention requires a detailed description of the loss mechanisms in $ZnCl_2$, as well as a discussion of the processing techniques which yield such a fiber.

I. Loss Mechanisms

A. Scattering Considerations

To yield the ultralow loss obtained in this invention, scattering losses must be kept to a minimum. Consideration of the appropriate governing equations, which follows, indicates that low scattering loss requires operation as far in the infrared as possible, consistent with other limitations, and preferably a choice of a single component low melting glass. Deviation from a single component glass, in the form of an appropriate gradation, may nevertheless be desirable in multimode configurations.

The scattering phenomenon may be described in terms of the dielectric fluctuation model described in Volume 22 of the *Applied Physics Letters* at page 527. According to this report the scattering coefficient ($\alpha$) is given by the expression $$\alpha \sim \lambda^{-4} n^8 p^2 \beta T_g \qquad (1)$$

Where $\lambda$ is the optical wavelength, n is the index of refraction, p is the average photoelastic constant, $\beta$ is the isothermal compressability and $T_g$ is the glass transition temperature. It is immediately apparent that since $\alpha$ is approximately 0.8 dB/km at 1 micron for fused silica, the wavelength dependence of $\alpha$ will yield $\alpha$'s in the regions of $10^{-3}$ dB/km for $\lambda$ approximately 4 microns, in appropriate glasses. This, of course, assumes that the other quantities remain constant. While the value of those quantities in other materials may deleteriously affect the scattering properties, some of the quantities may have values that yield improvement in the scattering. For example, the glass transition temperature for silica is 1700 degrees K. while the corresponding transition temperature for $ZnCl_2$ is only 366 degrees K.

Using known empirical constants and on the basis of the known behavior of electronic oscillator strengths, it may be reliably stated that $$n^8 p^2 \sim B^2 Z_a^2 / E_o^4 \qquad (2)$$

Where $E_o$ is the average energy gap of the glass, $Z_a$ is the formal chemical valence of the anion (e.g., 2 for oxides, 1 for halides), and B is a dimensionless structure factor given by $$B = N_a d^3 \qquad (3)$$

Here $N_a$ is the volume density of anions and d is the first neighbor bond length. B ranges from a maximum 0.7 for close packed equal spheres to 0.184 for fused silica and even lower for molecular solids. In crystalline $ZnCl_2$, B is 0.325.

Combining Equations 1 and 2:

$$\alpha \sim \lambda^{-4} B^2 Z_a^2 \beta T_g / E_o^4 \qquad (4)$$

From Equation 4 it is apparent that the halides with $Z_a = 1$ provide an intrinsic factor of four improvement over the oxides with a $Z_a$ of 2. Since open structures (low B) are obviously advantageous, it should be noted that B is approximately 0.325 for materials with cations located in tetrahedral sites within a close packed anion lattice (e.g., ZnO, $ZnCl_2$) whereas B is approximately 0.5 for cations in octahedral sites (e.g., NaCl or $CdCl_2$). A low cation coordination number is therefore desirable.

From Equation 4 it is apparent that large energy gaps (i.e., $E_o$) are advantageous not only to keep the absorption low, but also to keep scattering losses down. Among the halides only fluorides exhibit larger gaps than chlorides. However, since fluoride glass formers have other limitations, chlorides are of primary interest in this invention.

B. Absorption Characteristics

For ultralow loss in the infrared the optical fiber material must have associated with it a fundamental electronic absorption edge, which lies at sufficiently short wavelengths so that the low energy tail of this edge is sufficiently small in the infrared region of interest. This requirement may be satisfied if the optical wavelength of interest falls well in the infrared. On the other hand, the high energy tail of the first lattice absorption edge must be at a wavelength well beyond the selected operative wavelength. These two considerations are found to limit the material choice essentially to the halides.

Figure 2:
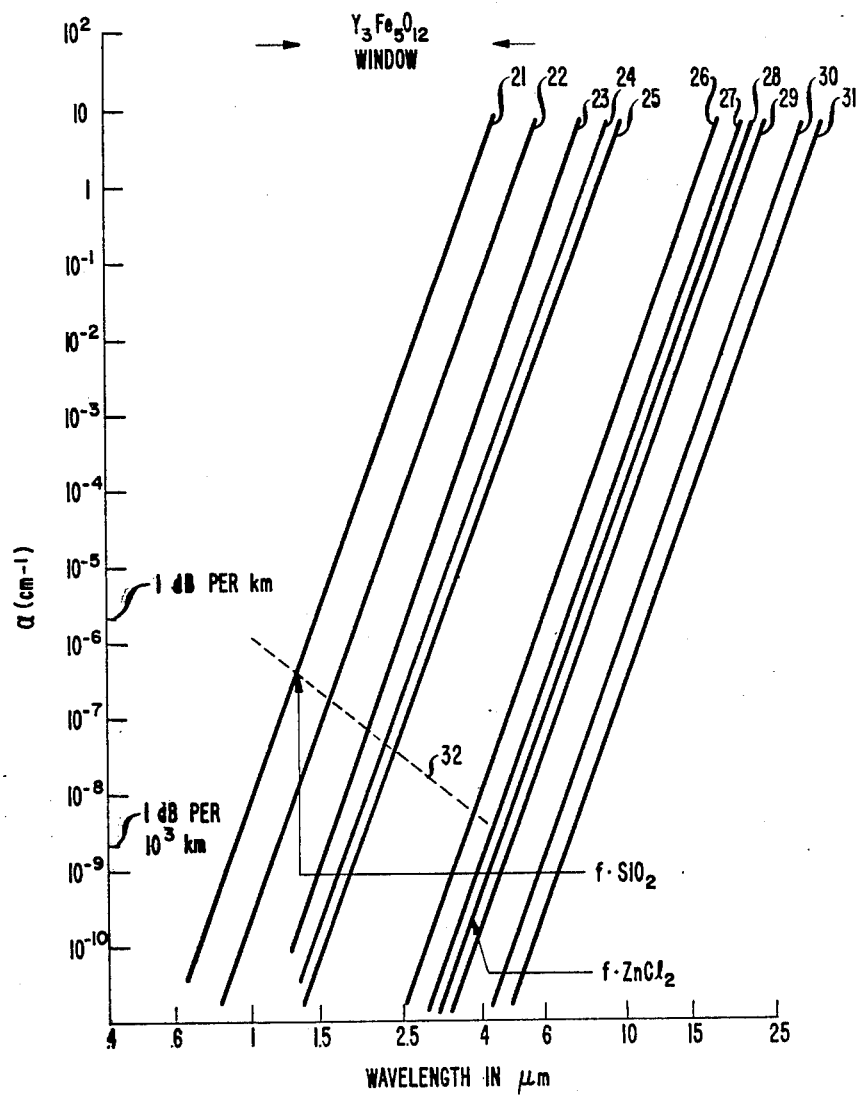
FIG. 2 is a plot of absorption data for various materials of interest.

Representative absorption data is shown in FIG. 2. The upper dash line 32 represents the scattering losses for both fused silica and $ZnCl_2$. The intrinsic lattice absorption for various solids (21 through 31) is determined from known absorption values of the materials coupled with a conservative power law extrapolation to lower values at shorter wavelengths. In this figure, the various intrinsic absorption lines are associated with the following materials: (21) fused $SiO_2$, (22) $Al_2O_3$, (23) LiF, (24) $MgF_2$, (25) fused $BeF_2$, (26) KF, (27) NaCl, (28) $ZnCl_2$, (29) KCl, (30) KBr, (31) TlBr. These data clearly suggest that certain halides provide ultralow loss in the 3.0 to 4.5 micron region of the spectrum.

C. Impurity Absorption

FIG. 2 shows the region of transparency of $Y_3Fe_5O_{12}$, a compound in which a common glass impurity, the iron ion ($Fe^{3+}$), is highly concentrated and is fully oxidized. This window clearly permits transmission of light in the 3.0 to 4.5 micron range where other inherent losses associated with $ZnCl_2$ are minimal. Other fully oxidized transition metal ion impurity absorptions are also significantly lower in this region. Absorption is most critical for cations in lower valence states. Applicants have shown that such impurity ions are easily oxidized to higher valence states by treating molten $ZnCl_2$ with $Cl_2$. Furthermore, absorption by water is approximately two orders of magnitude lower in the 3.0 to 4.5 micron region than at 1.1 microns. This consideration of the effect of impurities leads to the conclusion that levels of water below 0.1 ppm and $Fe^{3+}$ below 10 ppm may be acceptable.

D. Material Dispersion

The arrow tips in FIG. 2 indicate the intrinsic absorption at the wavelengths at which the material dispersion goes to zero for fused silica (1.28 microns) and fused $ZnCl_2$ (3 to 4.5 microns). Because of the effect that material dispersion has in limiting the information carrying capacity of the optical fiber, it is desirable to choose a wavelength that simultaneously meets low absorption loss, low scattering loss, and low material dispersion requirements. Although material dispersion data were not available for $ZnCl_2$, we have calculated the zero crossover wavelength of the material dispersion using known electronic and phonon oscillator strength trends. Such considerations yield a crossover wavelength in the region of from 3.0 to 4.5 microns, a region which, as shown in FIG. 2, has associated with it ultralow absorption loss for $ZnCl_2$.

E. Glass Forming Characteristics

Glass formation is favored by tetrahedral coordination and/or by an open anion sublattice. The rock salt structure alkaki halide as well as materials with partially filled octahedral sites in a close packed anion lattice are not usually viewed as glass formers.

$ZnCl_2$, which has tetrahedral coordination, can be made to form a glass by rapid quenching. There are reports in the literature that such glass formation in a thin film configuration may be obtained by quickly squeezing molten $ZnCl_2$ between metal blocks. Improved stabilities have been observed by incorporating KCl, KBr, or KI into the glass.

Ordinarily, $ZnCl_2$ can be stabilized in the glassy state by strong heating in a necked down Vicor tube until ebullation ceases and further heating in a vacuum until bumping takes place. In this case the material apparently does not require fast cooling. However, at least one percent ZnO is usually present in such $ZnCl_2$ and the presence of oxygen is not desirable for low transmission loss purposes. $ZnCl_2$ can be purified by passing dry HCl through the material when in a low viscosity melt state and can be kept in the glassy state by asperating the melt into thin-walled Pyrex capillary tubes followed by quenching in a stream of dry nitrogen, however, impurity levels are still found to be relatively high.

II. Exemplary Formation of ZnCl₂

Applicants have found that a stable, water-clear, low loss glass can be obtained by bubbling $Cl_2$ through the molten $ZnCl_2$, preferably at approximately 470±20 degrees C. but usually within the range 350 degrees C. to 600 degrees C. The indications are that protons in the melt, which may be responsible for rapid crystallization, are removed by vacuum treatment and treatment with $Cl_2$. The $Cl_2$ treatment provides additionally the possibility of removing oxygen, and oxidizing reduced ions and organic material present in the melt with the chlorine. Volatile products are removed by chlorine and subsequent scrub gas streams. Any scrub gas (e.g., Ar, He) that is soluble in $ZnCl_2$, may be removed by vacuum treatment at a reasonable temperature.

A process for making ultralow loss $ZnCl_2$ comprises the following steps:

1. Start with $ZnCl_2$ that is at least 0.99999 pure.
2. Dissolve in ultra pure water.
3. Pass the solution through a micropore filter.
4. Boil down under an inert gas cover to regain the $ZnCl_2$.
5. Pass clean dry HCl through the molten $ZnCl_2$ at 470±20 degrees C. to convert oxides etc. to chlorides by double exchange.
6. Pass clean dry $Cl_2$ through the melt to oxidize any reduced ions or organic matter.
7. Pass clean dry Helium through the melt to sweep out any remaining HCl or $Cl_2$.
8. Place the melt under at least a partial vacuum to remove the last traces of gas, and maintain it while cooling to form the solid.

III. Exemplary Formation of the Optical Fiber

The $ZnCl_2$ may be used as a core material for an ultralow loss optical fiber transmitting light in the region of 3.0 to 4.5 microns. A mixed glass with a lower index of refraction such as $4ZnCl_2$-KBr-KI can act as a suitable cladding. Such a glass can be formed by mixing KBr and KI into the $ZnCl_2$. The KBR and KI are separately purified by treatments similar to those employed to purify the $ZnCl_2$, but using gases corresponding to the new anions. Potassium chloride and/or KBr can be used to decrease the index, while a more important function of KI is to increase the randomization of the anion mixture, thereby increasing the stability of the glass.

The $ZnCl_2$ melt has a viscosity of 29 Poise, 9 degrees C. above its melting point (318 degrees C.). Hence it can be pulled in this temperature range. The substituted glass has a somewhat lower melting or softening temperature and therefore the $ZnCl_2$ can be pulled through or encased in the latter to form a step or graded fiber. The degree of interdiffusion depends upon the time the core and cladding remain in contact at the pulling temperature. The profile can be controlled by adjusting temperature, pull rate and interdiffusion distance.

Since $ZnCl_2$ is hygroscopic the pulling is carried out in a dry, oxygen-free atmosphere. If the fiber is to be used in an environment containing water vapor an appropriate protective jacket should be applied. For example, immediately upon drawing, the fiber can be coated with an alloy in the tertiary system, such as In-Ga-Sn (including the associated binarys), or any other material that melts below the glass transition temperature. The resulting fiber may be coated with a plastic, such as epoxy-acrylate that is polymerized by ultraviolet either before, after, or before and after the placement of the water protective jacket.

A resulting exemplary fiber is shown in FIG. 1 where 10 is the core and 11 is the cladding. In this figure, additional protective jackets are included in 11. Input and output devices effective in the wavelength range of interest are shown as 12 and 13. Such devices may be simple protective films, focusing elements or appropriate sources and detectors.

The core and the cladding in the fiber shown in FIG. 1 may each have an associated index of refraction value. In the alternative, and especially when the fiber is used to transmit electromagnetic radiation in the multimode configuration, either the core or the cladding or both may have an index of refraction which is radially graded, decreasing in value as the radius increases. In usually graded configurations the entire core or cladding will be graded but this is not absolutely necessary and only a portion of the core and/or cladding may be graded. In any event, both the core and the cladding have associated with them at least one index of refraction value.

We claim:
1. An information transmission system comprising
   a source of electromagnetic radiation,
   a detector of electromagnetic radiation, and
   an optical fiber for transmitting electromagnetic radiation between the source and the detector; the optical fiber comprising a core region having associated with it at least one first value of index of refraction and a cladding region having associated with it at least one second lower value of index of refraction; the core region of the said fiber comprising amorphous $ZnCl_2$; the invention CHARACTERIZED IN THAT the source and detector of electromagnetic radiation are capable of operating in the wavelength range between 1 and 7 microns.

2. The device of claim 1 wherein the source and detector of electromagnetic radiation are capable of operating in the wavelength range between 3.0 and 4.5 microns.

3. The device of claim 1 wherein the fiber has an index of refraction which is at least partially radially graded, the index of refraction of the graded portion decreasing in value with increasing radius.

4. The device of claim 3 wherein the graded portion of the $ZnCl_2$ fiber includes at least one additive selected from the group consisting of KBr, KCl, and KI.

5. The device of claim 3 wherein the graded portion of the $ZnCl_2$ fiber contains two or more additives selected from the group consisting of KBr, KCl, and KI.

6. The device of claim 1 wherein the core comprises $ZnCl_2$ and the cladding comprises a mixed glass formed from $ZnCl_2$ and at least one material selected from the group consisting of KBr, KCl, and KI.

7. The device of claim 1 further comprising a protective jacket that is substantially impermeable to water.

8. The device of claim 7 wherein the protective jacket comprises a material that melts below the glass transition temperature of the fiber.

9. The device of claim 8 wherein the protective jacket comprises an alloy in the tertiary system In-Ga-Sn.

10. The device of claim 7 further including at least one plastic coating around the optical fiber.

11. The device of claim 10 wherein a plastic coating lies between the jacket and the fiber.

12. The device of claim 10 wherein a plastic coating lies over the jacket.

13. The device of claim 10 wherein a plastic coating lies between the jacket and the fiber and another plastic coating lies over the jacket.

14. A process for making optical fibers comprising purifying $ZnCl_2$ at least in part by passing dry chlorine through molten $ZnCl_2$ to oxidize any reduced ions or organic matter;

heating the $ZnCl_2$ to yield a molten material comprising $ZnCl_2$; and forming the molten material into a fiber.

* * * * *